United States Patent Office 3,178,423
Patented Apr. 13, 1965

3,178,423
2-HYDRAZINO-1,3,5-TRIAZINES
Alexander Staehelin, Reinach, Basel-Land, and Albrecht Hueni, Basel, Switzerland, assignors to Ciba Corporation, New York, N.Y., a corporation of Delaware
No Drawing. Filed Jan. 28, 1964, Ser. No. 340,777
Claims priority, application Switzerland, July 21, 1960, 8,355/60; Aug. 4, 1960, 8,838/60; Oct. 11, 1960, 11,392/60; June 19, 1961, 7,177/61
13 Claims. (Cl. 260—240)

This is a continuation-in-part of our co-pending application Ser. No. 124,327, filed July 17, 1961, now abandoned.

The present invention relates to 2-acylhydrazino-4:6-bis-tertiary amino-1:3:5-triazines and their salts, and to processes for preparing same.

In the new compounds the hydrazino group may contain further substituents, for example simply or doubly bound lower hydrocarbon radicals, above all lower alkyl such as methyl, ethyl, n-propyl or iso-propyl groups, or ethylidene or benzylidene radicals.

Acyl radicals are such of organic carboxylic acids, such, for example, as carbonic acid semiesters, for example ethyl esters, N-unsubstituted or N-substituted, for example alkylated, phenylated, benzylated or phenylethylated carbamic acids, or aliphatic, alicyclic, aromatic, araliphatic and heterocyclic or heterocyclic-aliphatic carboxylic acids, for example lower alkanecarboxylic acids or cycloalkyl-lower alkanecarboxylic acids, such as acetic, propionic, pivalic acid, diethylacetic acid or cyclohexylacetic acid, cycloalkane-carboxylic acids, such as cyclopentane- or cyclohexane-carboxylic acid, benzoic or naphthoic acids, phenyl- or naphthyl-lower alkanecarboxylic acids or phenyl- or napththyl-lower alkenecarboxylic acids, such as phenylacetic, α-phenylpropionic or β-phenylpropionic, α-phenylbutyric, β-phenylbutyric or γ-phenylbutyric or naphthyl-propionic acid, or cinnamic acid, pyridine-, furan- or thiophene-carboxylic acids, such as nicotinic, iso-nicotinic, furan-2- or thiophene-2-carboxylic acid, or heterocyclyl-lower alkane-carboxylic acids, such as pyridyl-(4) acetic, or β-[furyl-(2)]-propionic acid.

The acyl radicals of the aforementioned carboxylic acids are preferably unsubstituted, but they may also be substituted, those of the aliphatic carboxylic acids, for example, by free or substituted hydroxyl, mercapto or amino groups, especially lower alkoxy, lower alkylmercapto, aryl- or aralkyloxy or mercapto groups, di-lower alkylamino or alkylene-, oxa- or aza-alkyleneamino groups, such as methoxy, ethoxy, n-propoxy, iso-propoxy, phenyloxy, phenylmercapto, benzyloxy, benzylmercapto, phenylethoxy or phenylethylmercapto radicals, dimethylamino or diethyl-amino, pyrrolidino, piperidino, hexamethyleneimino, morpholino, piperazino or 4-lower alkyl-piperazino, for example 4-methylpiperazino groups, or halogen atoms, such as fluorine, chlorine or bromine or by free or functionally converted carboxyl groups, such as esterified carboxyl groups, for example carbo-lower alkoxy groups, carbamyl radicals or nitrile groups.

Any aromatic nuclei present in the acyl radicals are unsubstituted or substituted, for example, by lower alkyl, hydroxyl, lower alkoxy or amino, for example di-lower alkylamino groups of the kind defined above; furthermore by lower alkylenedioxy, such as methylenedioxy, or nitro groups or by halogen such as fluorine, chlorine or bromine, or by halogen-lower alkyl groups, such as trifluoromethyl, or by free carboxyl groups or carboxyl groups converted, for example as shown above. Heterocyclic nuclei may likewise be unsubstituted or substituted, for example by the aforementioned lower alkyl, lower alkoxy, nitro, amino or carboxyl groups or by halogen atoms.

The tertiary amino groups present in positions 4 and 6 of the new triazines contain lower hydrocarbon radicals of aliphatic character which may also be interrupted in the carbon chain by hetero atoms, such as oxygen, nitrogen or sulfur.

Lower hydrocarbon radicals of aliphatic character are above all saturated or simply unsaturated alkyl, cycloalkyl or cycloalkyl radicals containing at most 8 carbon atoms. Radicals of this kind interrupted by hetero atoms are above all oxaalkyl, oxaalkylene, azaalkylene or oxacycloalkyl-alkyl radicals. There may be mentioned more especially methyl, ethyl, allyl, propyl, isopropyl, straight or branched radicals, bound in any desired position, being butyl, pentyl, hexyl or heptyl radicals, 3-oxabutyl, 3-oxapentyl, 3-oxaheptyl, butylene-(1:4), butylene-(1:5), hexylene-(1:5), hexylene-(1:6), hexylene-(2:5), heptylene-(1:7), heptylene-(2:7), heptylene-(2:6), 3-oxa- or azo-pentylene-(1:5), 3-oxa- or aza-hexylene-(1:6), cyclopentyl, cyclohexyl, cyclopentenyl or cyclohexenyl radicals, cyclopentyl-, cyclohexyl-, cyclopentenyl-, cyclohexenyl-methyl or -ethyl radicals. The tertiary amino groups are more especially di-lower alkylamino groups, and above all diethylamino groups.

The invention provides more especially compounds of the formula

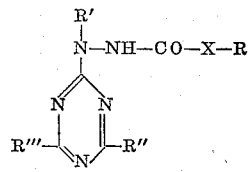

and their salts, wherein R' is hydrogen or lower alkyl, R is hydrogen, amino, lower alkyl-amino, di-lower alkylamino, lower alkylene-amino, lower monooxa-alkyleneamino, lower monoaza-alkyleneamino, a group of the formula

wherein R' has the meaning given above and Z is cyclo lower alkyl, phenyl, naphthyl, furyl, thienyl or pyridyl or such aromatic radicals substituted by halogen, lower alkyl, lower alkoxy, nitro, oxy or amino, or Z hydroxy, oxy, cyano, carbamyl, lower alkoxy, carbo-lower alkoxy, lower alkylmercapto, Y—O— or Y—S—, wherein Y is phenyl, halogen-phenyl, lower alkyl-phenyl or lower alkoxy-phenyl, and X is a lower alkylene or alkenylene radicals or, if R is other than oxy, halogeno, cyano, carbamyl, Y—O— or Y—S— or carbo-lower alkoxy, also a direct bondage, and the groups R" and R'" are each di-lower alkylamino, lower alkylene-amino, lower monooxa-alkylene or lower monoaza-alkylene.

The lower alkyl radical R' is, for example, methyl, ethyl or a straight or branched propyl, butyl or pentyl radical. The same radicals may represent the lower alkyl radicals in the lower alkyl-amino or di-lower alkylamino groups as well as in the other radicals mentioned above; they may also represent the lower alkyl portion of the various lower alkoxy-groups mentioned above.

Lower alkylene-amino groups are e.g. pyrrolidino, piperidino or hexyleneamino groups which may be substituted by lower alkyl groups, especially methyl.

Cycloalkyl radicals are especially cyclopentyl and cylohexyl which may carry lower alkyl substituents.

Lower monooxa-alkylene radicals are e.g. morpholino radicals which may also be substituted by lower alkyl radicals.

Lower monoaza-alkylene radicals are e.g. piperazino or 3-aza-hexylene-1:6-radicals which may be substituted, e.g. lower alkylated at ring carbon atoms or lower alkylated or hydroxy-lower alkylated at the aza-nitrogen atom, e.g.

N-lower alkyl-piperazino, or
N-hydroxy-lower alkyl-piperazino, such as N-methyl or β-hydroxy-ethyl-piperazino.

Halogen atoms are especially chloro or bromo.

The group X may be a lower alkylene radical, such as methylene, ethylene or a straight or branched propylene, butylene or pentylene radical or a lower alkylene radical such as ethenylene, or a straight or branched propenylene, butenylene or pentenylene radical.

The group —CO—X—R is especially a piperidino-acetyl, benzoyl, phenyl-lower alkanoyl, phenyl-lower alkenoyl, pyridoyl, furoyl or thienoyl radical wherein the aromatic or heterocyclic nuclei may be substituted as indicated above, and above all the phenylacetyl, nicotinoyl, isonicotinoyl or furoyl radical.

The groups R" and R'" are especially diethylamino or pyrrolidino groups.

The new compounds and their salts have valuable pharmacological properties. Inter alia they inhibit the transmission of excitation in the central nervous system and can therefore be used as medicaments, for example as spinal blockers in the treatment of neurological diseases, more especially such as are accompanied by increased spasticity. They are further suitable for use in veterinary medicine. Furthermore, the new compounds are more stable and easier to purify than the known unacylated 2-hydrazino-4:6-bis-diethylamino-1:3:5-triazine.

Of special value are compounds of the formula

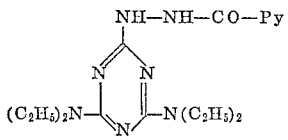

and their salts, in which formula Py represents a pyridyl radical. In these compounds the pyridyl radical may be substituted, for example by lower alkyl groups, such as methyl, ethyl, propyl or butyl, halogen atoms, such as chlorine or bromine, nitro or amino groups. But it is preferably unsubstituted. The pyridyl radical may contain the carboxyl group in any desired position, preferably however in position 3 or 4.

Of special value are also compounds of the formula

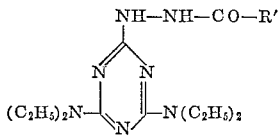

and their salts, in which formula R' represents a tertiary amino-lower alkyl radical, for example a di-lower alkyl-amino-lower alkyl radical or an alkyleneimino-lower alkyl radical, such as indicated above, e.g. the pyrrolidino-methyl or piperidino-methyl radical, or R' may also represent a phenyl, phenyl-lower alkyl or phenyl-lower alkenyl radical which may be substituted as defined above, and it may represent more especially phenyl, hydroxyphenyl, halogen-phenyl, phenylethenyl or particularly benzyl; R' may also represent a furyl or thienyl radical, preferably furyl (2) or thienyl-(2).

Particularly useful are compounds of the formula

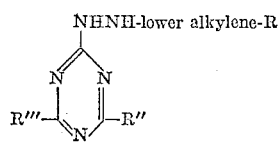

and their salts, wherein lower alkylene is ethylene but more advantageously methylene, R is a di-lower alkyl-amino or lower alkyleneamino group, such as indicated above, and R" and R'" are diethylamino or pyrrolidino groups, as well as compounds of the formula

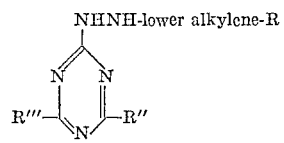

and their salts, wherein lower alkylene is ethylene but more advantageously methylene, R is phenyl or phenyl substituted as indicated above, and R" and R'" are diethylamino or pyrrolidino groups, as well as compounds of the formula

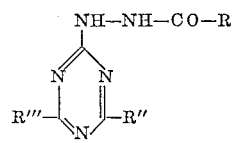

and their salts, wherein R is phenyl or pyridyl or phenyl or pyridyl substituted as indicated above and R" and R'" are diethylamino or pyrrolidino groups.

Particularly valuable is 2-(2'-phenyl-acetyl-hydrazino)-4:6 - bis - diethylamino - 1:3:5 - triazine and its salts, and 2-(2'-benzoyl-hydrazino)-4:6 - bis - diethylamino - 1:3:5-triazine, 2-(2'-furoyl-hydrazino-)-4:6:bis - diethylamino-1:3:5-triazine, 2-(2'-isonicotinoyl-hydrazino)-4:6-bis-diethylamino-1:3:5-triazine, 2-(2'-nicotinoyl - hydrazino)-4:6-bis-diethylamino-1:3:5-triazine and their salts.

The new compounds are prepared by as such known methods, preferably by acylating a 2-hydrazino-4:6-bis-tertiary amino-1:3:5-triazine. Suitable acylating agents are reactive functional derivatives of the acids mentioned above, above all their esters, anhydrides or halides, or in the case of carbamic acids also their anhydro forms, that is to say the isocyanates, if desired in the form of salts thereof. If desired, the reaction may be performed in the presence of a condensing agent, such as an inorganic or organic base. Especially suitable are tertiary organic bases, such as pyridine or trialkylamine, for example trimethyl- or triethylamine, metal salts of the carboxylic acid used or anhydrous alkali metal carbonates, for example sodium carbonate.

It is of advantage to react the hydrazine compound with an acid chloride, if desired, in the form of an acid addition salt, for example a hydrohalide, in the presence of one of the aforementioned basic condensing agents, above all of a strong organic tertiary base, such as a trialkylamine.

According to another modification of the process a 2-X-4-Y-6-tertiary amino-1:3:5-triazine, in which X represents a halogen atom, such as chlorine or bromine, and Y represents an acylhydrazino or a tertiary amino group, is reacted with a secondary amine or, when Y is a tertiary amino group, with an acylated hydrazine containing at least one hydrogen atom, for example one of the formula H$_2$N'—NH'—R, in which R has the meaning given above. The reaction is advantageously carried out in the presence of a diluent, if desired also in the presence of a condensing agent, for example in the presence of an excess of hydrazine or amine, and furthermore if desired in the presence of a catalyst, such as copper powder. The substituents present in resulting compounds may be converted or eliminated in the conventional manner; thus, a methylidene, such as alkylidene or benzylidene group, contained in the hydrazino group can be eliminated by hydrolysis or converted by reduction into an alkyl or benzyl group, or a reacitve halogen atom present in the acyl radical can be replaced by an amino group, or a nitro group reduced to an amino group.

The reactions are carried out in the known manner, as mentioned above in the absence, or advantageously in the presence of a condensing agent and/or catalyst, at room temperature or preferably at a raised temperature.

Depending on the reaction conditions employed, the new compounds are obtained in the form of the free bases or of their salts. From compounds with carboxyl groups metal salts, such as alkali metal or alkaline earth metal salts, may be obtained, whereas from the bases therapeutically useful salts may be formed with acids, for example hydrohalic acids, sulfuric acids, phosphoric acids, nitric acid, perchloric acid; aliphatic, alicyclic, aromatic or heterocyclic carboxylic or sulfonic acids, such as formic, acetic, propionic, oxalic, succinic, glycollic, lactic, malic, tartaric, citric, ascorbic, maleic, hydroxymaleic, dihydroxymaleic or pyruvic acid; phenylacetic, benzoic, para-aminobenzoic, anthranilic, para-hydroxybenzoic, salicylic or para-aminosalicylic acid; methanesulfonic, ethanesulfonic, hydroxyethanesulfonic, ethylenesulfonic acid; toluenesulfonic, naphthalene-sulfonic acids or sulfanilic acid; methionine, tryptophan, lysine or arginine. Resulting salts may be converted into the free compounds.

The 2-hydrazino-4:6-bis-tertiary amino-1:3:5-triazines (in which at least one tertiary amino group is not a diethylamino group) used as starting materials are new and accordingly form another object of the present invention; they likewise have the action stated above as characteristic of the end products, though to a lesser extent and can accordingly be used as medicaments. They are obtained, for example, by reacting hydrazine with a 2-X-4:6-bis-tertiary amino-1:3:5-triazine, in which X has the meaning given above and at least one tertiary amino group is not a diethylamino group or by reacting an acylhydrazine with a 2:4-di-X-6-tert.-amino-1:3:5-triazine, wherein X has the meaning given above.

The other starting materials required for carrying out the reactions described above are known or, insofar as they are new, they can be made by conventional methods.

The invention further includes any variant of the present process in which a compound obtained as intermediate at any stage of the process is used as starting material and the remaining process steps are carried out, or the process is discontinued at any stage, or a starting material is formed in the course of the reaction or used in the form of a salt thereof.

The 2-acylhydrazino-4:6-bis-tertiary - amino-1:3.5-triazines or their salts may be used as medicaments, for example in the form of pharmaceutical preparations containing said compounds or salts thereof in admixture with a pharamaceutical organic or inorganic solid or liquid excipient suitable for enteral or parenteral administration. Suitable excipients are substances that do not react with the new compounds such, for example, as water, gelatine, lactose, starches, magnesium stearate, talc, vegetable oils, benzyl alcohols, gums, polyalkyleneglycols, cholesterol or any other known pharmaceutical excipients. The pharmaceutical preparations may be, for example, in the form of tablets, dragees or in liquid form as solutions, suspensions or emulsions. They may be sterilized and/or may contain assistants, such as preservatives, stabilizers, wetting agents or emulsifiers, salts for regulating the osmotic pressure, or buffers. They may also contain other therapeutically valuable substances. The preparations are formulated by conventional methods. They contain the active ingredient for example in an amount of 5 to 100 mg. per dosage unit. The quantity of excipient may, of course, vary within wide limits, but the new preparations preferably contain 1 to 60% of active ingredient.

The following examples illustrate the invention; the term "heating" indicating that the mixture is boiled under reflux, if not otherwise indicated:

*Example 1*

12.0 grams of 2-hydrazino-4:6-bis-diethylamino-1:3:5-triazine and 8.5 grams of isonicotinic acid chloride hydrochloride are suspended in 100 cc. of ethyl acetate and heated to the boil on a water bath. The hot suspension is treated dropwise with a solution of 10 grams of triethylamine in 50 cc. of ethyl acetate and then heated for another 5 hours. The triethylamine hydrochloride formed crystallizes out. The mixture is cooled, washed with water, then with 2N-sodium bicarbonate solution and again with water until the washings are neutral. The ethyl acetate solution is dried and completely evaporated. On cooling and inoculation the oily residue becomes crystalline. In this manner 2-(2'-isonicotinoyl-hydrazino)-4:6-bis-diethylamino-1:3:5-triazine of the formula

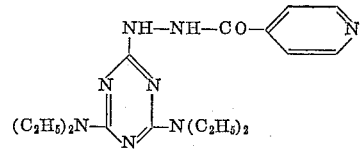

is obtained in white crystals melting at 155–156.5° C.

*Example 2*

A suspension of 12.0 grams of 2-hydrazino-4:6-bis-diethylamino-1:3:5-triazine and 8.5 grams of nicotinic acid chloride hydrochloride in 100 cc. of ethyl acetate is heated to the boil. This hot suspension is treated dropwise with a solution of 10 grams of triethylamine in 50 cc. of ethyl acetate within 30 minutes and then heated for another 1½ hours. The triethylamine hydrochloride formed crystallizes out. The mixture is cooled, washed successively with water, then with 2 N-sodium bicarbonate solution and with water until the washings are neutral. The ethyl acetate solution is dried over active carbon and completely evaporated. On cooling, the thickly liquid residue turns crystalline throughout and is recrystallized from ether+petroleum ether or benzene+petroleum ether, to yield 2-(2'-nicotinoyl-hydrazino)-4:6-bis-diethylamino-1:3:5-triazine of the formula

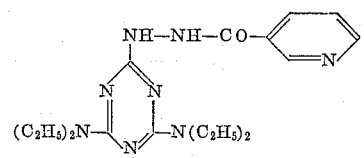

in white crystals melting at 115–116° C.

*Example 3*

A suspension of 12 grams of 2-hydrazino-4:6-bis-dimethyl-amino-1:3:5-triazine and 10.8 grams of isonicotinic acid chloride hydrochloride in 200 cc. of ethyl acetate is heated to the boil on a water bath. The resulting hot solution is treated dropwise with a solution of 12.3 grams of triethylamine in 30 cc. of ethyl acetate and then heated at the boil for 5 hours, whereupon the triethylamine hydrochloride formed crystallizes out. The reaction mixture is cooled, diluted with a small amount of chloroform, filtered, and the residue is washed with water and dried. From the filtrate the organic phase is separated, washed with dilute sodium carbonate solution and then with water, dried and the solvent is evaporated. The residues obtained by evaporation and filtration are combined and recrystallized from absolute ethanol, to yield 2-(2'-isonicotinoyl-hydrazino)-4:6-bis-dimethylamino-1:3:5-triazine of the formula

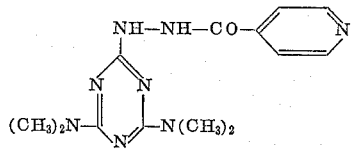

in white crystals melting at 205–206° C.

The 2-hydrazino-4:6-bis-dimethylamino - 1:3:5-triazine used as starting material is prepared in the following manner:

63.6 grams of 2-chloro-4:6-bis-dimethylamino-1:3:5-triazine (W. M. Pearlman and C. K. Blanks, J. Am. Chem. Soc. 70, page 3726 [1948]) in 400 cc. of ethanol are mixed with 47.4 grams of hydrazine hydrate and the mixture is heated at the boil for 4 hours. The reaction mixture is completely evaporated and the residue crystallized from aqueous ethanol, to yield 2-hydrazino-4:6-bis-dimethylamino-1:3:5-triazine of the formula

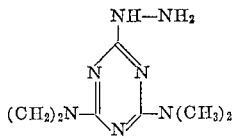

in the form of white crystals melting at 137–139° C.

*Example 4*

A suspension of 12 grams of 2-hydrazino-4:6-bis-piperidino-1:3:5-triazine and 7.7 grams of isonicotinic acid chloride hydrochloride in 200 cc. of ethyl acetate is heated to the boil on the water bath. The hot suspension is then treated dropwise with a solution of 8.8 grams of triethylamine in 30 cc. of ethyl acetate and heated for another 4 hours, whereupon the triethylamine hydrochloride formed crystallizes out. The mixture is cooled, diluted with a small amount of chloroform and then treated with water. The organic phase is washed with dilute sodium hydroxide solution and then with water and completely evaporated. The remaining crystalline 2-(2'-isonicotinoyl-hydrazino)-4:6 - bis - piperidino-1:3:5-triazine of the formula

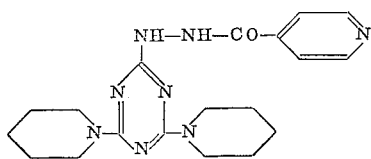

is crystallized from ethyl acetate and is obtained in the form of white crystals melting at 201–203° C.

The 2-hydrazino-4:6-bis-piperidino-1:3:5-triazine used as starting material is prepared in the following manner:

71.3 grams of 2-chloro-4:6-bis-piperidino-1:3:5-triazine (W. M. Pearlman and C. K. Blanks, J. Am. Chem. Soc. 70, page 3726 [1948]) in 400 cc. of ethanol are mixed with 30 grams of hydrazine hydrate and heated at the boil for 4 hours. The solvent is completely evaporated and the residue recrystallized from ethanol of 80% strength, to yield 2-hydrazino-4:6-bis-piperidino-1:3:5-triazine of the formula

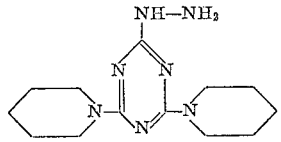

in white crystals melting at 134–136° C.

*Example 5*

A suspension of 13.4 grams of 2-(1'-methylhydrazino)-4:6-bis-diethylamino-1:3:5-triazine and 9.0 grams of nicotinic acid chloride hydrochloride in 100 cc. of ethyl acetate is heated to the boil on a water bath. The resulting hot solution is treated dropwise with a solution of 10.3 grams of triethylamine in 30 cc. of ethyl acetate and heated for another 4 hours, whereupon the triethylamine hydrochloride formed crystallizes out spontaneously. The reaction mixture is cooled, washed with water, then with dilute sodium hydroxide solution and once more with water until the washings are neutral. The dried ethyl acetate solution is completely evaporated and the oily residue recrystallized from ether+petroleum ether, to yield 2-(2'-nicotinoyl-1'-methylhydrazino)-4:6-bis-diethylamino-1:3:5-triazine of the formula

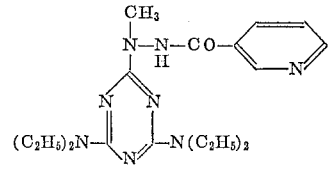

in white crystals melting at 93–94° C.

The 2 - (1' - methylhydrazino)-4:6-bis-diethylamino-1:3:5-triazine used as starting material is prepared in the following manner:

A solution of 15.0 grams of 2-chloro-4:6-bis-diethylamino-1:3:5-triazine and 6.6 grams of methylhydrazine in 100 cc. of ethanol is boiled for 4 hours. The mixture is completely evaporated and the residue is dissolved in ether, washed with water and then three times with dilute hydrochloric acid until the washings are acid. The aqueous acid solution is alkalinized with dilute sodium hydroxide solution and repeatedly agitated with ether. The ether solution is dried and completely evaporated and the liquid residue is distilled in a high vacuum, to yield 2 - (1' - methylhydrazino)-4:6-bis-diethylamino-1:3:5-triazine of the formula

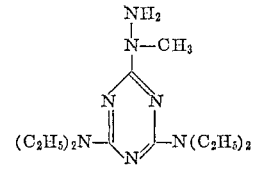

in the form of a liquid boiling at 126–128° C. under a pressure of 0.15 mm. Hg.

*Example 6*

A suspension of 31.1 grams of 2-hydrazino-4:6-bis-diethylamino-1:3:5-triazine and 17.4 grams of picolinic acid chloride hydrochloride in 300 cc. of ethyl acetate is heated on a water bath to the boil while being stirred. The hot suspension is stirred and treated dropwise with a solution of 24.8 grams of triethylamine in 40 cc. of ethyl acetate and then heated for another 5 hours. The mixture is cooled, washed with water, then with dilute sodium carbonate solution and again with water until the washings are neutral. The dried ethyl acetate solution is completely evaporated and the oily residue recrystallized from ethyl acetate+petroleum ether, to yield 2-(2' - picolinoyl) - hydrazino)-4:6-bis-diethylamino-1:3:5-triazine of the formula

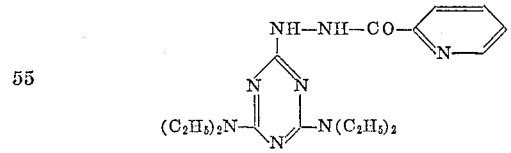

in white crystals melting at 120–122° C.

*Example 7*

A suspension of 12.3 grams of 2-hydrazino-4-diethylamino-6-pyrrolidino-1:3:5-triazine and 8.75 grams of isonicotinic acid chloride hydrochloride in 150 cc. of ethyl acetate is heated on a water bath to the boil. The hot suspension is treated dropwise with a solution of 9.9 grams of triethylamine in 30 cc. of ethyl acetate and then heated for another 5 hours, whereupon the triethylamine hydrochloride formed crystallizes out. The cooled mixture is diluted with a small amount of chloroform and washed with water, then with dilute sodium carbonate solution and once more with water until the washings are neutral. The dried organic phase is completely evaporated and the crystalline residue is recrystallized from ethyl acetate +ethanol+petroleum ether, to yield 2-(2'-isonicotinoylhydrazino)-4-diethylamino-6-pyrrolidino-1:3:5-triazine of the formula

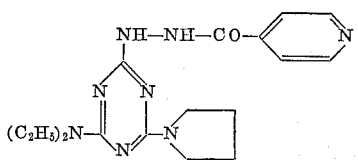

in white crystals melting at 194–196° C.

The 2-hydrazino-4-diethylamino-6-pyrrolidino-1:3:5-triazine used as starting material is prepared in the following manner:

A solution of 42 grams of 2:4-dichloro-6-diethylamino-1:3:5-triazine (J. T. Thurston and co-workers, J. Am. Chem. Soc. 73, page 2981 [1957]) in 250 cc. of benzene is treated at room temperature with a solution of 27 grams of pyrrolidine in 100 cc. of benzene, with the internal temperature rising slightly and pyrrolidine hydrochloride separating out in oily form. The mixture is kept for one hour at room temperature and then filtered through active carbon, concentrated, and the residue is extracted with hot petroleum ether. The extract is again filtered through active carbon, the petroleum ether is distilled off and the pale yellowish residue, consisting of 2-chloro-4-diethylamino-6-pyrrolidino-1:3:5-triazine, is recrystallized from methanol; it forms white prisms melting at 90–91° C.

13.4 grams of 2-chloro-4-diethylamino-6-pyrrolidino-1:3:5-triazine in 100 cc. of ethanol are treated with 7.9 grams of hydrazine hydrate and the mixture is heated for 4 hours at the boil. During the reaction an oil separates out. The solvent is completely evaporated and the residue is treated with water and repeatedly agitated with ether. The ether solution is agitated with 2N-hydrochloric acid, the said aqueous solution is separated and alkalinized with 10 N-sodium hydroxide solution and again repeatedly agitated with ether. The dried organic phase is completely evaporated. The oily residue, consisting of 2-hydrazino-4-diethylamino-6-pyrrolidino-1:3:5-triazine, can be used as it is.

*Example 8*

A solution of 50 grams of 2-hydrazino-4:6-bis-diethylamino-1:3:5-triazine and 20 grams of triethylamine in 400 cc. of ethyl acetate is treated at the boil, while being stirred, dropwise with a solution of 22.3 grams of chloracetyl chloride in 50 cc. of ethyl acetate. The triethylamine hydrochloride formed crystallizes out spontaneously. After heating for 5 hours the mixture is cooled, washed with water, then with dilute sodium carbonate solution and once more with water until the washings are neutral. The dried ethyl acetate solution is completely evaporated and the thickly liquid residue can be further worked up as it is. A specimen recrystallized from ethyl acetate+petroleum ether forms crystals; 2-(2'-chloracetylhydrazino)-4:6-bis-diethylamino-1:3:5-triazine melts at 103–105° C.

A solution of 15.0 grams of 2-(2'-chloracetylhydrazino)-4:6-bis-diethylamino-1:3:5-triazine in 100 cc. of benzene is treated dropwise at the boil with a solution of 6.5 grams of pyrrolidine in 30 cc. of benzene, whereupon the pyrrolidine hydrochloride formed separates out spontaneously in the form of an oil. After heating for 4 hours the mixture is cooled and washed with water until the washings are neutral. The dried benzene solution is completely evaporated and the crystalline residue crystallized from ethyl acetate+petroleum ether, to yield 2-(2'-pyrrolidino-acetylhydrazino)-4:6-bis-diethylamino-1:3:5-triazine of the formula

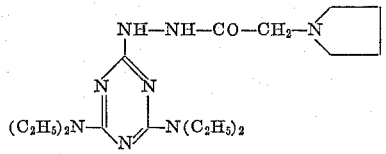

in white crystals melting at 119–120° C.

*Example 9*

A solution of 15 grams of 2-(2'-chloracetylhydrazino)-4:6-bis-diethylamino-1:3:5-triazine in 100 cc. of benzene is treated dropwise at the boil with a solution of 7.75 grams of piperidine in 30 cc. of benzene. The piperidine hydrochloride formed crystallizes out spontaneously. The mixture is heated for 4 hours, cooled, diluted with a small amount of chloroform and washed twice with water. The dried organic phase is completely evaporated and the crystalline residue recrystallized from ethyl acetate, to yield 2-(2'-piperidino-acetylhydrazino)-4:6-bis-diethylamino-1:3:5-triazine of the formula

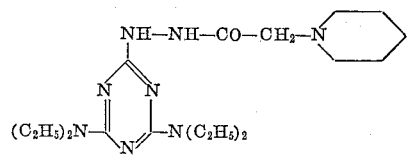

in white crystals melting at 154–155° C.

*Example 10*

A solution of 15.0 grams of 2-hydrazino-4:6-bis-diethylamino-1:3:5-triazine and 6.0 grams of triethylamine in 100 cc. of ethyl acetate is treated at room temperature, while being stirred, dropwise with 8.4 grams of benzoyl chloride in 20 cc. of ethyl acetate, whereby the internal temperature rises slightly and triethylamine hydrochloride separates out. The reaction mixture is heated for another hour at the boil, cooled, and washed with water, then with dilute sodium carbonate solution and once more with water until the washings are neutral. The dried ethyl acetate solution is completely evaporated and the crystalline residue is recrystallized from ethyl acetate+petroleum ether, to yield 2-(2'-benzoylhydrazino)-4:6-bis-diethylamino-1:3:5-triazine of the formula

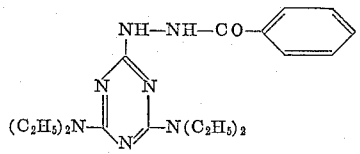

in white crystals melting at 121–122° C.

When the latter product is reacted with 2 N-hydrochloric acid or ethanolic hydrochloric acid and recrystallized from absolute ethanol, a crystalline hydrochloride melting at 228–235° C. is obtained.

*Example 11*

A solution of 12.0 grams of 2-hydrazino-4:6-bis-diethylamino-1:3:5-triazine and 4.8 grams of triethylamine in 150 cc. of ethyl acetate is treated at the boil dropwise with a solution of 7.45 grams of salicylic acid chloride in 30 cc. of ethyl acetate. The triethylamine hydrochloride formed crystallizes out. The mixture is heated for 5 hours, cooled, and washed with water, then with dilute sodium carbonate solution and once more with water until the washings are neutral. The dried ethyl acetate solution is completely evaporated and the oily residue recrystallized from ethyl acetate+petroleum ether, to yield 2-(2'-salicyloyl-hydrazino)-4:6-bis-diethylamino-1:3:5-triazine of the formula

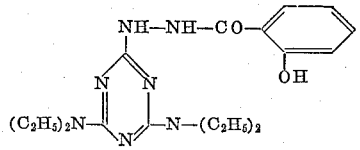

in white crystals melting at 129–130° C.

Example 12

A solution of 10.0 grams of 2-hydrazino-4:6-bis-diethylamino-1:3:5-triazine and 4.0 grams of triethylamine in 120 cc. of ethyl acetate is treated at the boil dropwise with a solution of 6.1 grams of phenylacetic acid chloride in 30 cc. of ethyl acetate. The triethylamine hydrochloride formed crystallizes out spontaneously. The mixture is heated for 5 hours, cooled, and washed with water, then with dilute sodium carbonate solution and once more with water until the washings are neutral. The dried ethyl acetate solution is completely evaporated and the crystalline residue recrystallized from ethyl acetate+petroleum ether, to yield 2-(2'-phenylacetylhydrazino)-4:6-bis-diethylamino-1:3:5-triazine of the formula

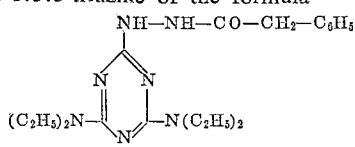

in white crystals melting at 135–136° C.

Example 13

A solution of 12.0 grams of 2-hydrazino-4:6-bis-diethylamino-1:3:5-triazine and 4.8 grams of triethylamine in 100 cc. of ethyl acetate is treated at the boil dropwise with a solution of 7.9 grams of cinnamic acid chloride in 100 cc. of ethyl acetate. The mixture is heated for 5 hours, cooled, the crystalline phase is suctioned off, washed with water, dried and recrystallized from aqueous ethanol, to yield 2-(2'-cinnamoyl-hydrazino)-4:6-bis-diethylamino-1:3:5-triazine of the formula

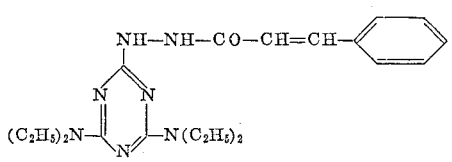

in white crystals melting at 177–178° C.

Example 14

A solution of 12.0 grams of 2-hydrazino-4:6-bis-diethylamino-1:3:5-triazine and 4.8 grams of triethylamine in 150 cc. of ethyl acetate is treated at the boil dropwise with a solution of 6.8 grams of furoyl chloride in 30 cc. of ethyl acetate. The triethylamine hydrochloride formed crystallizes out spontaneously. The mixture is heated for 5 hours, cooled, and washed with water, then with dilute sodium carbonate solution and once more with water until the washings are neutral. The dried ethyl acetate solution is completely evaporated and the residue crystallized from ethyl acetate+petroleum ether, to yield 2-(2'-furoyl-hydrazino) - 4:6 - bis-diethylamino-1:3:5-triazine of the formula

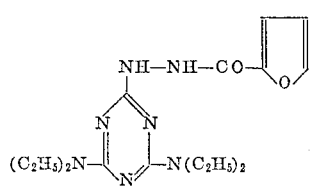

in white crystals melting at 97–98° C.

Example 15

A solution of 12 grams of 2-hydrazino-4:6-bis-diethylamino-1:3:5-triazine and 4.8 grams of triethylamine in 100 cc. of ethyl acetate is treated at the boil dropwise with a solution of 6.4 grams of diethylacetyl chloride in 30 cc. of ethyl acetate. After heating for 4 hours, the product is worked up as described in Example 11. The crude product is recrystallized from a mixture of ethyl acetate and petroleum ether. The reseulting 2-(2'-diethyl-acetyl-hydrazino) - 4:6 - bis-diethylamino-1:3:5-triazine of the formula

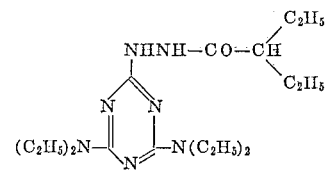

forms colorless crystals melting at 139–141° C.

Example 16

12.0 grams of 2-hydrazino-4:6-bis-diethylamino-1:3:5-triazine and 4.8 grams of triethylamine are dissolved in 100 cc. of ethyl acetate with stirring and treated at the boil dropwise with a solution of 8.0 grams of β-phenyl-propionic acid chloride in 30 cc. of ethyl acetate. After heating for 4 hours the reaction product is worked up as described in Example 11. The crude product is recrystallized from mixture of ethyl acetate and petroleum ether. The resulting 2-(2'-β-phenyl-propionyl-hydrazino)-4:6-bis-diethylamino-1:3:5-triazine of the formula

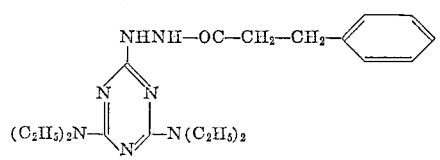

forms colorless crystals melting at 99.5–101° C.

Example 17

12.0 grams of 2-hydrazino-4:6-bis-diethylamino-1:3:5-triazine and 4.8 grams of triethylamine are dissolved with stirring in 150 cc. of ethyl acetate and treated at the boil dropwise with a solution of 10.5 grams of m-chlorophenyl-mercapto-acetic acid chloride in 50 cc. of ethyl acetate. After heating for 4 hours, the reaction product is worked up as described in Example 11. The crude product is recrystallized from a mixture of ethyl acetate and petroleum ether. The resulting 2-(2'-[m-chlorophenyl - mercapto - acetyl] - hydrazino)-4:6-bis-diethylamino-1:3:5-triazine of the formula

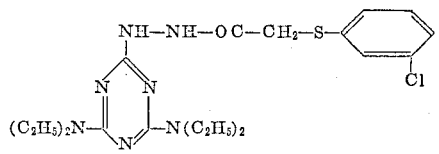

forms crystals melting at 92.5–94° C.

Example 18

12.0 grams of 2-hydrazino-4:6-bis-diethylamino-1:3:5-triazine and 4.8 grams of triethylamine are dissolved with stirring in 150 cc. of ethyl acetate and treated at the boil dropwise with a solution of 7.8 grams of succinic acid monochloride monoethyl ester in 30 cc. of ethyl acetate. After heating for 4 hours, the reaction product is worked up as described in Example 11. The crude product is recrystallized from a mixture of ethyl acetate and petroleum ether. The resulting 2-[2'-(β-carbethoxy-propionyl)-hydrazino]-4:6-bis-diethylamino-1:3:5-triazine of the formula

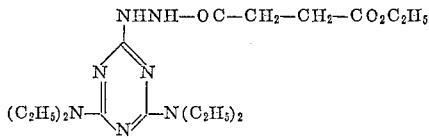

forms colorless crystals melting at 104–105° C.

Example 19

12.0 grams of 2-hydrazino-4:6-bis-diethylamino-1:3:5-triazine and 7.2 grams of triethylamine are dissolved with stirring in 200 cc. of ethyl acetate and treated at the boil dropwise with a solution of 7.7 grams of n-caprylic acid chloride in 30 cc. of ethyl acetate. After

13 heating for 5 hours, the reaction product is worked up as described in Example 11. The crude product is recrystallized from ether. The resulting 2-(2'-caproyl-hydrazino)-4:6-bis-diethylamino-1:3:5-triazine of the formula

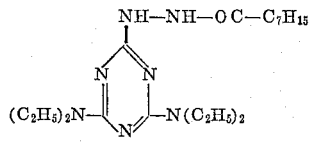

forms colorless crystals melting at 90–92° C.

Example 20

12.0 grams of 2-hydrazino-4:6-bis-diethylamino-1:3:5-triazine and 4.8 grams of triethylamine are dissolved with stirring in 200 cc. of ethyl acetate and treated at the boil dropwise with a solution of 9.2 grams of p-chlorobenzoyl chloride in 40 cc. of ethyl acetate. After heating for 4 hours, the reaction product is worked up as described in Example 11. The crude product is recrystallized from a mixture of ethyl acetate and petroleum ether. The resulting 2-(2'-p-chlorobenzoyl-hydrazino)-4:6-bis-diethylamino-1:3:5-triazine of the formula

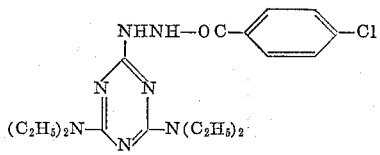

forms crystals melting at 169–170° C.

Example 21

17.0 grams of 2-hydrazino-4:6-bis-diethylamino-1:3:5-triazine and 6.8 grams of triethylamine are dissolved with stirring in 250 cc. of ethyl acetate and treated at the boil dropwise with a solution of 12.4 grams of p-nitrobenzoyl chloride in 150 cc. of ethyl acetate. After heating for 4 hours, the reaction product is worked up as described in Example 11. The crystalline crude product is recrystallized from a mixture of ethyl acetate and petroleum ether. The resulting 2-(2'-p-nitrobenzoyl-hydrazino)-4:6-bis-diethylamino-1:3:5-triazine of the formula

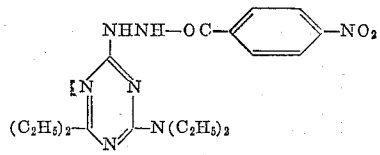

forms crystals melting at 171–172° C.

Example 22

9.1 grams of 2-(1'-methylhydrazino)-4:6-bis-diethylamino-1:3:5-triazine and 3.5 grams of triethylamine are dissolved with stirring in 150 cc. of ethyl acetate and treated the boil dropwise with a solution of 5.3 grams of phenylacetic acid chloride in 30 cc. of ethyl acetate. After heating for 4 hours, the reaction product is worked up as described in Example 11. The crystalline crude product is recrystallized from a mixture of ethyl acetate and petroleum ether. The resulting 2-(2'-phenylacetyl-1'-methylhydrazino)-4:6-bis-diethylamino-1:3:5-triazine of the formula

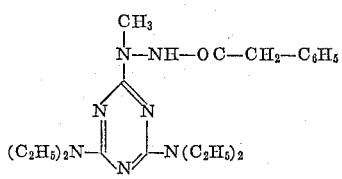

forms crystals melting at 130–131.5° C.

14

Example 23

9.0 grams of 2-hydrazino-4-diethylamino-6-pyrrolidino-1:3:5-triazine and 3.6 grams of triethylamine are dissolved with stirring in 150 cc. of ethyl acetate and treated at the boil dropwise with a solution of 5.6 grams of phenylacetic acid chloride in 30 cc. of ethyl acetate. After heating for 4 hours, the reaction product is worked up as described in Example 11. The crystalline crude product is recrystallized from a mixture of ethyl acetate, alcohol and petroleum ether. The resulting 2-(2'-phenylacetyl - hydrazino) - 4-diethylamino-6-pyrrolidino-1:3:5-triazine of the formula

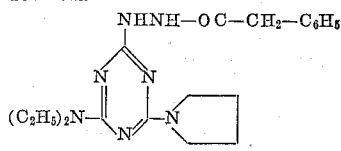

forms crystals melting at 175–176° C.

Example 24

10.0 grams of 2-(1'-methylhydrazino)-4-diethylamino-6-pyrrolidino-1:3:5-triazine and 3.8 grams of triethylamine are dissolved with stirring in 150 cc. of ethyl acetate and treated at the boil dropwise with a solution of 5.9 grams of phenylacetic acid chloride in 30 cc. of ethyl acetate. After heating for 4 hours, the reaction product is worked up as described in Example 11. The crystalline crude product is recrystallized from a mixture of ethyl acetate and petroleum ether. The resulting 2-(2'-phenylacetyl - 1' - methylhydrazino)-4-diethylamino-6-pyrrolidino-1:3:5-triazine of the formula

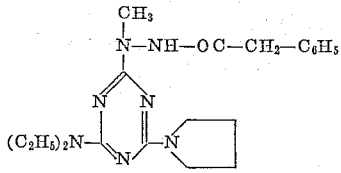

forms colorless crystals melting at 137–138° C.

The 2-(1'-methylhydrazino)-4-diethylamino-6-pyrrolidino-1:3:5-triazine used as starting material is obtained as follows:

42 grams of 2:4-dichloro-6-diethylamino-1:3:5-triazine (J. T. Thurston et al., J. Am. Chem. Soc. 73, 2981, 1957) are dissolved in 250 cc. of benzene and treated at room temperature with a solution of 27 grams of pyrrolidine in 100 cc. of benzene. The internal temperature increases slightly and the pyrrolidine hydrochloride precipitates in the form of an oil. After being allowed to stand for 1 hour at room temperature, the mixture is filtered through active carbon, concentrated and the residue extracted with hot petroleum ether. The extract is again filtered through active carbon, the extracting agent is evaporated off and the pale yellow residue consisting of 2-chloro-4-diethylamino-6-pyrrolidino-1:3:5 - triazine is recrystallized from methanol; the product forms white prisms melting at 90–91° C.

20 grams of 2-chloro-4-diethylamino-6-pyrrolidino-1:3:5-triazine and 9.0 grams of methylhydrazine are dissolved in 150 cc. of alcohol and heated for 4½ hours at the boil. The reaction product is worked up as described in Example 7. The liquid residue is distilled in a high vacuum to yield 2-(1'-methylhydrazino)-4-diethylamino-6-pyrrolidino-1:3:5-triazine of the formula

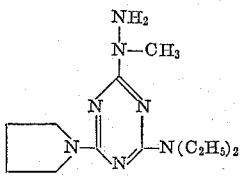

in the form of a liquid boiling at 119–121° C. under 0.07 mm. of pressure.

Example 25

A solution of 12.0 grams of 2-hydrazino-4:6-bis-dimethylamino-1:3:5-triazine and 10.8 grams of nicotinic acid chloride hydrochloride in 200 cc. of dioxane is treated at the boil dropwise with stirring with a solution of 12.3 grams of triethylamine in 30 cc. of dioxane. After heating for 4 hours, the contents of the flask are evaporated, water added to the residue, and the reaction mixture then made alkaline with a saturated solution of sodium hydroxide, and extracted several times with ethyl acetate. The dried ethyl acetate solution is then completely evaporated and the crude product recrystallized from a mixture of ethyl acetate and petroleum ether, or benzene. The resulting 2-(2′-nicotinoyl-hydrazino)-4:6-bis-dimethylamino-1:3:5-triazine of the formula

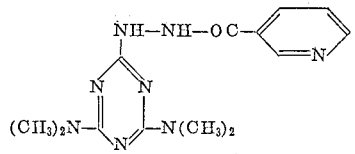

forms crystals melting at 151–152° C.

Example 26

10 grams of 2-hydrazino-4:6-bis-dimethylamino-1:3:5-triazine and 5.2 grams of triethylamine are dissolved with stirring in 250 cc. of ethyl acetate and treated at the boil dropwise with a solution of 7.9 grams of phenylacetic acid chloride in 30 cc. of ethyl acetate. After heating for 5 hours, water is added to the reaction mixture and a little insoluble material filtered off. The reaction product is worked up as described in Example 11. The crystalline crude product is recrystallized from ethyl acetate. The resulting 2-(2′-phenyl-acetyl-hydrazino)-4:6-bis-dimethylamino-1:3:5-triazine of the formula

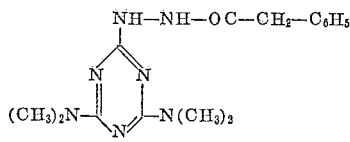

forms crystals melting at 143–145° C.

Example 27

17.1 grams of 2-hydrazino-4:6-bis-diethylamino-1:3:5-triazine and 6.9 grams of triethylamine are dissolved with stirring in 250 cc. of ethyl acetate and treated at the boil dropwise with a solution of 13.5 grams of p-nitrophenylacetic acid chloride in 50 cc. of ethyl acetate. After heating for 4 hours, the contents of the flask are treated with water and the insoluble product suction-filtered, washed with water and dried. The crude product is recrystallized from absolute alcohol. The resulting 2-(2′-p-nitrophenylacetyl-hydrazino) - 4:6 - bis - diethylamino-1:3:5-triazine of the formula

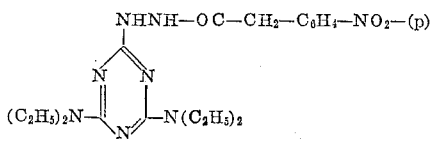

forms crystals melting at 190–191° C.

Example 28

15 grams of 2-(2′-p-nitrophenylacetyl-hydrazino)-4:6-bis-diethylamino-1:3:5-triazine are suspended in 400 cc. of rectified spirit and catalytically hydrogenated in the presence of 3.0 grams of Raney nickel at room temperature. After 11½ hours 2375 cc. of hydrogen (theory: 2420 cc.) are taken up. The solution is filtered off from the catalyst and completely evaporated. The residue is dissolved hot in absolute alcohol, rendered acid with an alcoholic hydrochloric acid solution, treated with absolute ether and cooled thoroughly. The hydrochloride which crystallizes out is filtered with suction and crystallized from methanol. The resulting 2-(2′-p-aminophenylacetyl-hydrazino) - 4:6-bis-diethylamino-1:3:5 - triazine hydrochloride of the formula

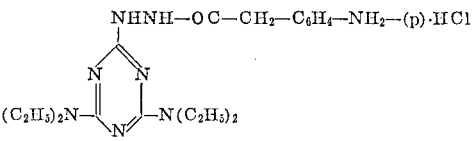

forms crystals melting at 242–244° C.

Example 29

14.0 grams of 2-(2′-p-nitrobenzoyl-hydrazino)-4:6-bis-diethylamino-1:3:5-triazine are dissolved in 200 cc. of ethyl acetate and catalytically hydrogenated in the presence of 3.0 grams of Raney nickel at room temperature. After 1 hour 2297 cc. of hydrogen (theory: 2340) are taken up. The solution is filtered off from the catalyst and evaporated. The oily residue is dissolved hot in absolute alcohol, rendered acid with an alcoholic hydrochloric acid solution and cooled, the hydrochloride crystallizing out. The resulting product is recrystallized from alcohol. The resulting 2-(2′-p-aminobenzoyl-hydrazino)-4:6-bis-diethylamino-1:3:5-triazine hydrochloride of the formula

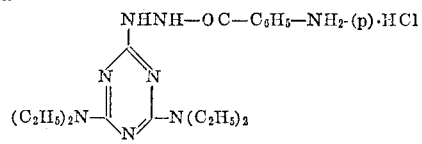

forms crystals melting at 253–256° C.

Example 30

10 grams of 2-hydrazino-4:6-bis-piperidino-1:3:5-triazine and 3.7 grams of triethylamine are suspended with stirring in 250 cc. of ethyl acetate and treated at the boil dropwise with a solution of 5.6 grams of phenylacetic acid chloride in 30 cc. of ethyl acetate. After heating for 5 hours, the contents of the flask are treated with water and the insoluble product filtered with suction, washed with water and dried. The crude product is recrystallized from ethyl acetate. The resulting 2-(2′-phenylacetylhydrazino)-4:6-bis-piperidino-1:3:5-triazine of the formula

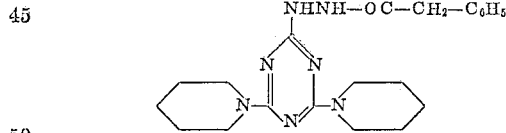

forms crystals melting at 162–164° C.

Example 31

12 grams of benzthiazole-2-carboxylic acid ethyl ester and 14.6 grams of 2-hydrazino-4:6-bis-diethylamino-1:3:5-triazine are heated at 140–150° C. in 150 cc. of absolute alcohol for 20 hours in a sealed steel tube. The contents of the tube are completely evaporated, the residue dissolved in chloroform and washed three times with dilute hydrochloric acid. The dried chloroform solution is evaporated, the residue treated with 2 N-sodium hydroxide solution and extracted several times with ethyl acetate. The dried ethyl acetate solution is evaporated. The crude product is recrystallized from a mixture of ethyl acetate and petroleum ether. The resulting 2-[2′-(2″ - benzthiazoyl) - hydrazino]-4:6-bis-diethylamino-1:3:5-triazine of the formula

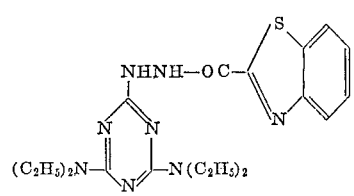

forms crystals melting at 140–141° C.

Example 32

12.0 grams of 2-hydrazino-4:6-bis-diethylamino-1:3:5-triazine and 4.8 grams of triethylamine are dissolved with stirring in 150 cc. of ethyl acetate and treated at the boil dropwise with a solution of 9.8 grams of α-naphthylacetic acid chloride in 30 cc. of ethyl acetate. After heating for 4 hours, the contents of the flask are suction-filtered, and the filtrate washed several times with water and dried. The crude product is recrystallized from ethyl acetate. The resulting 2-(2'-α-naphthylacetyl-hydrazino)-4:6-bis-diethylamino-1:3:5-triazine of the formula

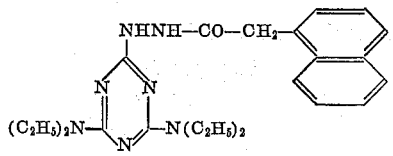

forms crystals melting at 151–152° C.

Example 33

50 grams of 2-hydrazino-4:6-bis-diethylamino-1:3:5-triazine and 20 grams of triethylamine are dissolved in 400 cc. of ethyl acetate and treated at the boil dropwise with stirring with a solution of 22.3 grams of chloracetyl chloride in 50 cc. of ethyl acetate. The resulting triethylamine hydrochloride crystallizes out immediately. After heating for 5 hours, the reaction mixture is cooled, washed first with water, then with dilute sodium carbonate solution and then with water until the runnings are neutral. The dried ethyl acetate solution is acidified with an alcoholic hydrochloric acid solution and treated with absolute ether. On cooling, the hydrochloride crystallizes out which is then suction-filtered and dissolved in warm water. The solution is rendered alkaline and extracted several times with ether. The dried ether solution is completely evaporated and the crude product recrystallized from a mixture of ether and petroleum ether. The resulting 2-(2'-chloracetyl-hydrazino)-4:6-bis-diethylamino-1:3:5-triazine of the formula

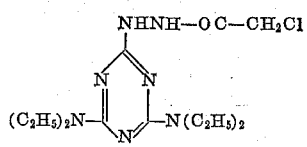

is identical with the product obtained in Example 8.

Example 34

12.0 grams of 2-hydrazino-4:6-bis-diethylamino-1:3:5-triazine and 4.8 grams of triethylamine are dissolved with stirring in 200 cc. of ethyl acetate and treated at room temperature dropwise with a solution of 6.1 grams of β-chloropropionic acid chloride in 40 cc. of ethyl acetate. After heating for 4 hours, the reaction product is worked up as described in Example 11. The crude product is recrystallized from a mixture of ethyl acetate and petroleum ether. The resulting 2-(2'-β-chloropropionyl-hydrazino)-4:6-bis-diethylamino-1:3:5-triazine of the formula

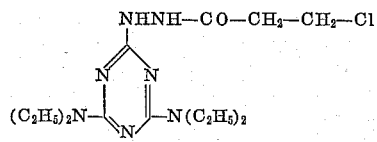

forms crystals melting at 104–105° C.

16 grams of 2-(2'-β-chloropropionyl-hydrazino)-4:6-bis-diethylamino-1:3:5-trazine are dissolved in 200 cc. of ethyl acetate and treated at room temperature with stirring with a solution of 8.7 grams of piperidine in 30 cc. of ethyl acetate. After heating for 6 hours, the cooled mixture is first washed with water, then three times with dilute hydrochloric acid. The acid aqueous solution is rendered alkaline and extracted several times with ether. The dried ethereal solution is completely evaporated, the residue dissolved warm in absolute alcohol, acidified with an alcoholic hydrochloric acid solution and treated with absolute ether. On cooling, the hydrochloride crystallizes out, is suction-filtered and recrystallized from a mixture of absolute alcohol and absolute ether. The resulting 2-(2'-β-piperidinopropionyl-hydrazino)-4:6-bis-diethylamino-1:3:5-triazine hydrochloride of the formula

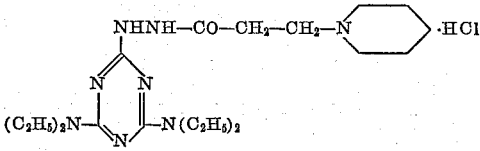

forms crystals melting at 223–225° C.

Example 35

15.2 grams of 2-hydrazino-4:6-bis-diethyl-amino-1:3:5-triazine and 6.1 grams of triethylamine are dissolved with stirring in 200 cc. of ethyl acetate and treated at room temperature dropwise with a solution of 9.7 grams of cyclohexylacetic acid chloride in 30 cc. of ethyl acetate. After heating for 4 hours, the reaction product is worked up as described in Example 11. The crystalline crude product is recrystallized from a mixture of ethyl acetate and petroleum ether. The resulting 2-(2'-cyclohexylacetyl-hydrazino)-4:6-bis-diethylamino-1:3:5-triazine of the formula

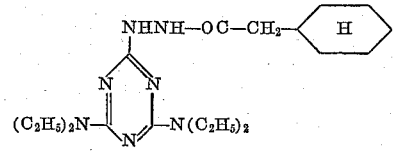

forms crystals melting at 118–120° C.

Example 36

15 grams of 2-hydrazino-4:6-bis-diethylamino-1:3:5-triazine and 6.0 grams of triethylamine are dissolved in 100 cc. of benzene and treated at the boil dropwise with a solution of 6.5 grams of chloroformic acid ethyl ester in 50 cc. of benzene. After heating for 5 hours, the mixture is cooled, washed twice with water, the benzene solution dried and completely evaporated. The viscous residue is dried and recrystallized from petroleum ether. The resulting 2-(2'-carbethoxy-hydrazino)-4:6-bis-diethylamino-1:3:5-triazine of the formula

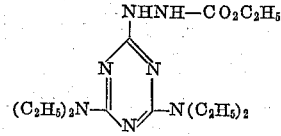

forms crystals melting at 60–62° C.

Example 37

13.4 grams of 2-hydrazino-4:6-bis-diethylamino-1:3:5-triazine are dissolved in 100 cc. of ethyl acetate and treated at room temperature with 6.3 grams of phenyl isocyanate. After 5 minutes the product begins to crystallize. After being allowed to stand for several hours, the crystalline product is suction-filtered and recrystallized from a mixture of alcohol and ethyl acetate. The resulting 2-[2'-N-(phenyl-carbamyl)-hydrazino]-4:6-bis-diethylamino-1:3:5-triazine of the formula

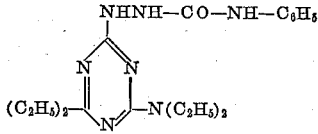

forms crystals melting at 174–176° C.

Example 38

15.0 grams of 2-hydrazino-4:6-bis-diethylamino-1:3:5-triazine and 6.0 grams of triethylamine are dissolved with stirring in 150 cc. of ethyl acetate and treated at room temperature dropwise with a solution of 6.4 grams of dimethylcarbamyl chloride in 30 cc. of ethyl acetate. After several hours at room temperature, the reaction mixture is heated for 2 hours at 45–50° C., cooled and washed twice with water. The dried ethyl acetate solution is completely evaporated and the crystalline residue recrystallized from a mixture of ethyl acetate and petroleum ether. The resulting 2-[2'-(N:N-dimethylcarbamyl) - hydrazino] - 4:6 - bis - diethylamino - 1:3:5-triazine of the formula

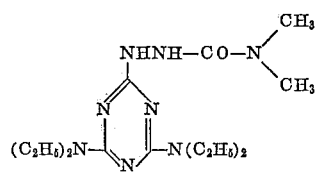

forms crystals melting at 145–147° C.

Example 39

15 grams of 2-hydrazino-4:6-bis-diethylamino-1:3:5-triazine and 6.0 grams of triethylamine are dissolved with stirring in 150 cc. of ethyl acetate and treated at room temperature dropwise with a solution of 8.0 grams of diethylcarbamyl chloride in 30 cc. of ethyl acetate. The reaction product is worked up after adding a little chloroform as described in Example 38. The crystalline residue is recrystallized from ethyl acetate. The resulting 2 - [2'(N:N - diethylcarbamyl) - hydrazino] - 4:6 - bis-diethylamino-1:3:5-triazine of the formula

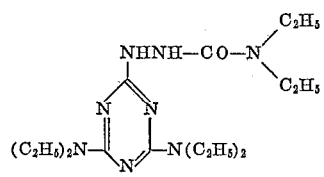

forms crystals melting at 142–144° C.

Example 40

9.0 grams of 2-(2'-acetylhydrazino)-4-diethylamino-6-chloro-1:3:5-triazine and 7.7 grams of diethylamine dissolved in 100 cc. of absolute alcohol are heated for 10 hours at the boil. The mixture is completely evaporated, the residue in the flask is dissolved in ethyl acetate and washed twice with water. The dried ethyl acetate solution is completely evaporated and the crystalline residue recrystallized from petroleum ether. There is obtained 2 - (2' - acetyl - hydrazino) - 4:6 - bis - diethylamino-1:3:5-triazine of the formula

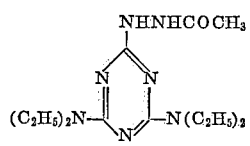

in colorless crystals which melt at 122–124° C.

The 2 - (2'-acetyl-hyrazino)-4-diethylamino-6-chloro-1:3:5-triazine used as starting material is prepared as follows:

10 grams of 2:6-dichloro-4-diethylamino-1:3:5-triazine (J. T. Thurston et al., J. Am. Chem. Soc. 73, 2981, 1957) are dissolved with stirring in 100 cc. of ethyl acetate and treated at room temperature dropwise with a solution of 3.4 grams of acetyl hydrazine and 4.6 grams of triethylamine in 100 cc. of ethyl acetate. The internal temperature increases slightly and triethylamine hydrochloride precipitates. After stirring for two hours at room temperature the mixture is washed twice with water, the dried ethyl acetate solution evaporated and the crystalline residue recrystallized from a mixture of ethyl acetate and petroleum ether to yield 2-(2'-acetylhydrazino)-4-diethylamino-6-chloro-1:3:5-triazine of the formula

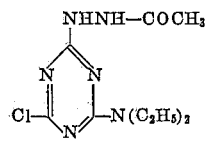

in crystals melting at 172–175° C.

Example 41

Tablets containing 10 mg. of 2-(2'-phenylacetyl-hydrazino)-4:6-bis-diethylamino-1:3:5-triazine may be prepared, for example, as follows.

| Ingredients: | Mg. |
|---|---|
| 2-(2'-phenylacetyl-hydrazino)-4:6-bis-diethylamino-1:3:5-triazine | 10 |
| Lactose | 60 |
| Starch | 61 |
| Stearic acid | 2.8 |
| Talc | 6.2 |
| | 140.0 |

The active substance is mixed homogeneously with the lactose and part of the starch is added. Part of the starch is heated with water on a water-bath, added to the powder mixture, granulated in the ordinary manner and dried. The remainder of the starch and the lubricant are added to the dry granulate. The tablets weighing 140 mg. are compressed in the usual manner.

What is claimed is:

1. A compound of the formula

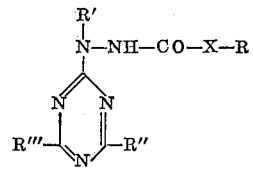

wherein R' is a member selected from the group consisting of hydrogen and lower alkyl, R is a member selected from the group consisting of (a) hydrogen, (b) cyclo-lower alkyl, phenyl, naphthyl, furyl, thienyl, pyridyl and said cyclic substituents substituted by a member selected from the group consisting of halogen, lower alkoxy, lower alkyl, nitro, hydroxy and amino, (c) halogen, hydroxy, cyano, carbamyl, carbo-lower alkoxy, phenyloxy, phenylmercapto, halogeno-phenyloxy, halogeno-phenyl-mercapto, lower alkoxy-phenyloxy, lower alkoxy-phenylmercapto, lower alkyl-phenyloxy, lower alkyl-phenylmercapto, (d) lower alkoxy lower alkylmercapto, amino, (e) lower alkylamino, di-lower alkylamino, pyrrolidino, piperidino, hexyleneamino, morpholino, piperazino, N-lower alkyl-piperazino, N-hydroxy-lower alkyl-piperazino and said cyclic amino substituents which are ring-lower alkylated, (f) N-cyclo-lower alkylamino, N-lower alkyl-N-cyclo-lower alkylamino and (g) N-aryl and N-lower alkyl-N-aryl-amino wherein aryl is a member selected from the group consisting of phenyl, naphthyl, furyl, thienyl and pyridyl and said aryl substituents substituted by a member selected from the group consisting of halogen, lower alkyl, lower alkoxy, nitro, hydroxy and amino, and X is a member selected from the group consisting of lower alkylene and lower alkenylene radicals and, when R is other than a member enumerated under (c), also a direct bond, and the groups R'' and R''' are each a member enumerated under (e).

2. A therapeutically useful acid addition salt of the compound shown in claim 1.

3. A compound of the formula

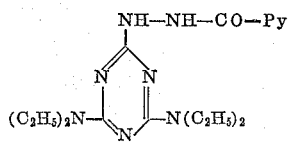

wherein Py represents pyridyl.

4. 2 - (2'-nicotinoyl-hydrazino)-4:6-bis-diethylamino-1:3:5-triazine.

5. 2-(2' - cinnamoyl-hydrazino)-4:6-bis-diethylamino-1:3:5-triazine.

6. 2 - (2' - phenyl - acetyl-hydrazino)-4:6-bis-diethyl-amino-1:3:5-triazine.

7. A therapeutically useful acid addition salt of the compound shown in claim 6.

8. 2 - (2' - benzoyl-hydrazino)-4:6-bis-diethylamino-1:3:5-triazine.

9. 2 - (2' - isonicotinoyl - hydrazino)-4:6-bis-diethyl-amino-1:3:5-triazine.

10. 2 - (2'-picolinoyl-hydrazino)-4:6-bis-diethylamino-1:3:5-triazine.

11. 2 - (2' - chlor-acetyl-hydrazino)-4:6-bis-diethyl-amino-1:3:5-triazine.

12. 2 - (2' - β-chlor-propionyl-hydrazino)-4:6-bis-di-ethylamino-1:3:5-triazine.

13. 2 - (2'-cyclohexylacetyl-hydrazino)-4:6-bis-diethyl-amino-1:3:5-triazine.

References Cited in the file of this patent
UNITED STATES PATENTS 2,418,336 D'Alelio _____ Apr. 1, 1947
2,824,103 Henni et al. _____ Feb. 18, 1958

OTHER REFERENCES

D'Alelio et al.: "Journal of Organic Chemistry," vol. 25, pages 202–205 (1950).